(12) United States Patent
Pavuk

(10) Patent No.: US 6,666,474 B2
(45) Date of Patent: Dec. 23, 2003

(54) SEMI-BALANCED TANDEM SUSPENSION

(75) Inventor: Gregory D. Pavuk, Royal Oak, MI (US)

(73) Assignee: Meritor Heavy Vehicle Technology LLC, Troy, MI (US)

( * ) Notice: Subject to any disclaimer, the term of this patent is extended or adjusted under 35 U.S.C. 154(b) by 41 days.

(21) Appl. No.: 10/150,678

(22) Filed: May 17, 2002

(65) Prior Publication Data

US 2003/0214118 A1 Nov. 20, 2003

(51) Int. Cl.$^7$ ................................................ B60G 5/00
(52) U.S. Cl. ...................... 280/677; 280/678; 280/679; 280/281.1; 280/124.106
(58) Field of Search ............................ 280/281.1, 80.1, 280/104, 676, 677, 678, 679, 124.1, 124.106

(56) References Cited

U.S. PATENT DOCUMENTS

| | | | | |
|---|---|---|---|---|
| 3,315,979 A | * | 4/1967 | Chalmers | 280/681 |
| 3,692,325 A | * | 9/1972 | Gouirand | 280/678 |
| 4,804,205 A | | 2/1989 | Parsons | 280/718 |
| 5,016,905 A | * | 5/1991 | Licari | 280/677 |
| 5,340,141 A | | 8/1994 | Thorndyke | 280/423.1 |
| 5,566,971 A | * | 10/1996 | Perlot | 280/124.109 |
| 6,152,486 A | | 11/2000 | Pierce | 280/755 |
| 6,199,876 B1 | | 3/2001 | Eckelberry | 280/6.151 |
| 6,263,801 B1 | | 7/2001 | Eckelberry | 105/215.2 |
| 6,276,710 B1 | * | 8/2001 | Sutton | 280/678 |
| 6,585,286 B2 | * | 7/2003 | Adema et al. | 280/677 |

* cited by examiner

*Primary Examiner*—J. Woodrow Eldred
(74) *Attorney, Agent, or Firm*—Carlson, Gaskey & Olds

(57) ABSTRACT

A suspension system provides a pair of walking beams mounted parallel to a longitudinal main frame of a vehicle subframe. The walking beams support tandem axles. The walking beams are mounted to lower outboard brackets extending from each axle. A spherical joint extending from each longitudinal end of each walking beam engages the lower outboard brackets. Each walking beam is constrained against fore-aft movement through a pair of watts linkages. The watts linkages are separated by a lateral torsion tube. Each walking beam is connected to its respective watts linkages through a revolute joint and pivot relative to the torque tube. A pair of tie-rods are attached between each watts linkages and a fixed support. The tie rods include spherical joints at each end. Each axle is further restrained by a V-rod attached to an upper bracket extending from each axle.

13 Claims, 2 Drawing Sheets

SEMI-BALANCED TANDEM SUSPENSION

BACKGROUND OF THE INVENTION

The present invention relates to a vehicle suspension system, and more particularly to a tandem axle suspension system in which each articulation mode is independently adjustable.

A variety of known suspension systems are available for passenger and heavy duty vehicles. One type of suspension system for heavy duty vehicles is air-based and includes the ability to adjust particular stiffness characteristics. Articulation of a tandem suspension is commonly separated into four distinct modes known as jounce, pitch, roll and warp. Stiffness in each of the modes depends primarily on spring forces developed through articulation at each corner. A stiffness adjustment of one mode typically effects the stiffness in one or more of the other modes.

With commercial of heavy-duty vehicles, it is advantageous to have low jounce stiffness that results in a soft ride. It is also advantageous to have a very high roll stiffness to counter high centers of gravity.

Warp stiffness is particularly relative to a tandem axle. High warp stiffness directly effects single wheel lift such as that caused when the suspension system strikes a curb. When a conventional tandem suspension system strikes a curb, the entire suspension system is twisted. As conventional suspension systems are relatively stiff in warp, rather large forces are transmitted through the entire suspension system even though only a single wheel contacts the curb. Multiple curb strikes may eventually disadvantageously affect the suspension system and may cause undesirable wear thereof.

Pitch stiffness in a tandem suspension is almost unnecessary as the sprung mass pitching forces are reacted as jounce forces on the tandem suspension as well as the vehicle's other suspension systems.

When loading a trailer, it is common to drive a lift truck onto the trailer bed. Because the lift truck is typically very heavy, a large load is rapidly imposed on the suspension system, which cannot react quick enough to avoid having the trailer bed drop suddenly as a result of the weight of the lift truck. Conversely, when the lift truck is driven off the trailer bed, the trailer may bounce upward in response to the force that is provided by the air-based suspension system.

Loading a trailer with a lift truck poses at least two problems. First, the repetitive downward and upward motion provides undesirable wear on the suspension system. Second, when the trailer is at a docking station, it is necessary to maintain the truck bed adjacent the loading dock to enable workers to easily move between the truck bed and the loading dock. The wheels of the trailer are therefore commonly locked once the trailer is properly positioned. However, conventional suspension systems typically move in an arc. Thus, when the lift truck drives onto the trailer, the trailer bed drops, and the suspension moves through its arc. Because the wheels are locked, the trailer moves forward and away from the dock, in a motion commonly referred to as "dock walk." Repetitive dock walk may cause the trailer to move a distance away from the docking station which may create loading and unloading difficulties.

Accordingly, it is desirable to provide a suspension system that provides for stiffness in each articulation mode to be independently adjusted to achieve the goals discussed above.

SUMMARY OF THE INVENTION

The suspension system according to the present invention provides a pair of walking beams mounted parallel to a longitudinal main frame of a vehicle subframe to support tandem axles. One or more airbags are attached between the walking beams and the subframe. The walking beams are mounted to lower outboard brackets extending from each axle. A spherical joint located at each longitudinal end of each walking beam engages the lower outboard brackets.

Each walking beam is constrained against fore-aft movement through a pair of watts linkages separated by a lateral torsion tube. Each walking beam is connected to its respective watts linkage through a revolute joint. A pair of tie-rods are attached through spherical joints between each watts linkage and a support which extends perpendicularly from the subframe. Each axle is further restrained by a V-rod attached between each axle and the subframe. The V-rod is mounted to a respective axle at the single upper bracket through a spherical joint.

The present invention provides for stiffness in jounce, roll, pitch and warp to be independently adjusted. In jounce, the stiffness is controlled solely by the airbags. In roll, the airbags are augmented by the stiffness of the torsion tube between the watts linkages. In pitch, the tandem axles are movable to "equalize" with little resistance. In warp, each axle is in opposing roll and free to move on the spherical joints with minimal resistance neither transmitting forces through the air springs nor the torsion tube.

The present invention provides stiffness in jounce, and roll, but minimal stiffness in the warp mode which significantly reduces single wheel lift force. The semi-balanced suspension system also provides minimal or no stiffness in pitch. A vehicle or trailer that is supported at either end by a suspension system according to the present has no need of pitch stiffness at either end as the trailer will pitch as a body in proportion to the jounce stiffness at either end.

Dock walk is practically eliminated because there is no swing-arm effect in the kinematics of the tandem suspension.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
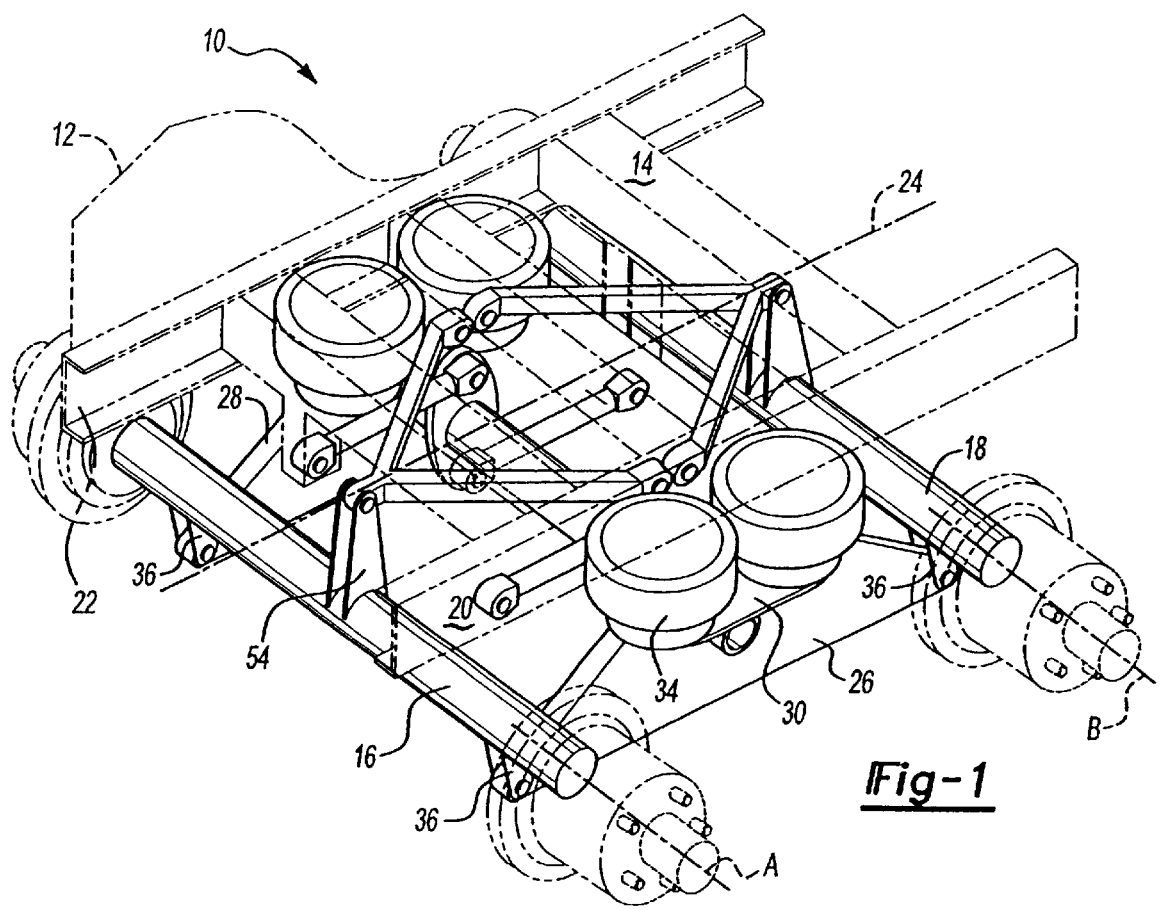
FIG. 1 is an upper perspective view of the suspension system according to the present invention.

FIG. 1 illustrates a general perspective view of a semi-balanced suspension system 10 mated with a generic vehicle. The vehicle 12 (illustrated schematically) is preferably a truck trailer which includes a subframe 14 supported by the suspension system 10. The suspension system 10 preferably includes two trailer wheel axles 16 and 18 which define axes A and B respectively. It should be realized, however, that many vehicles will benefit from the present invention. While the number of wheels depicted includes four wheels to each axle, it will be understood that this is consistent with standard eighteen-wheel tractor construction and that the number of axles and the number of wheels per axle can vary.

The subframe 14 includes a pair of longitudinal mainframes 20, 22 which extend parallel to a vehicle centerline 24. A pair of walking beams 26, 28 are mounted parallel to the longitudinal main frame 20, 22. Each walking beam 26, 28 is preferably located directly below a respective longitudinal mainframe 20,22. The walking beams 26,28 include spring pads 30,32. Each spring pad 30,32 preferably mounts one or more airbags 34 (two shown) which support the walking beams 26,28 relative the longitudinal mainframes 20,22. Other spring systems such as coil springs will also benefit from the present invention.

Figure 2:
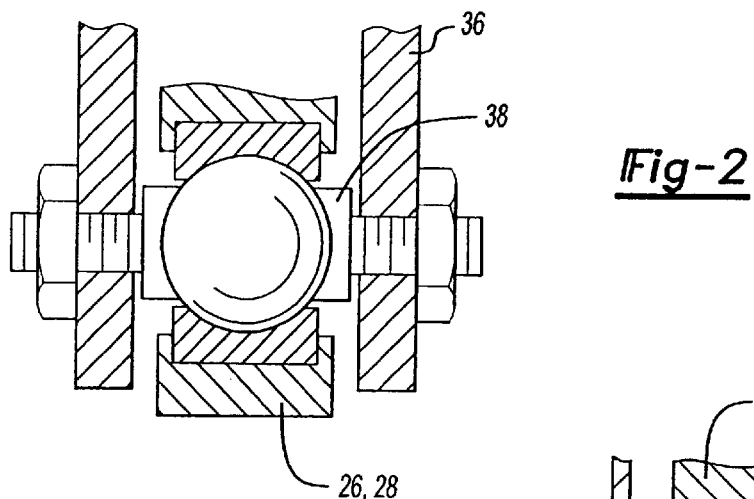
FIG. 2 is an expanded view of a universal joint.
Figure 3:
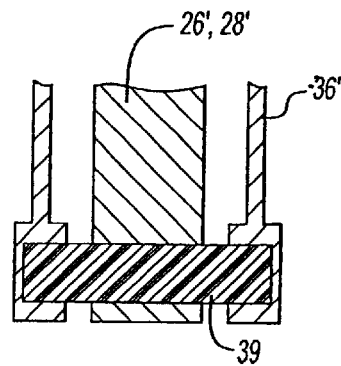
FIG. 3 is an expanded view of another universal joint.

The walking beams 26, 28 are mounted to lower outboard brackets 36 extending from each axle 16, 18. The lower outboard brackets 36 extend substantially perpendicular to each axle 16, 18. The lower outboard brackets 36 movably engage each longitudinal end of each walking beam 26, 28. A spherical joint 38 extending from each longitudinal end of each walking beam 26, 28 preferably engages the lower outboard brackets 36 (FIG. 2). The spherical joint may alternatively include a compliant bushing 39 (FIG. 3) which elastomerically provides articulation similar to a spherical joint. Other universally articulating links will also benefit from the present invention.

Figure 4:
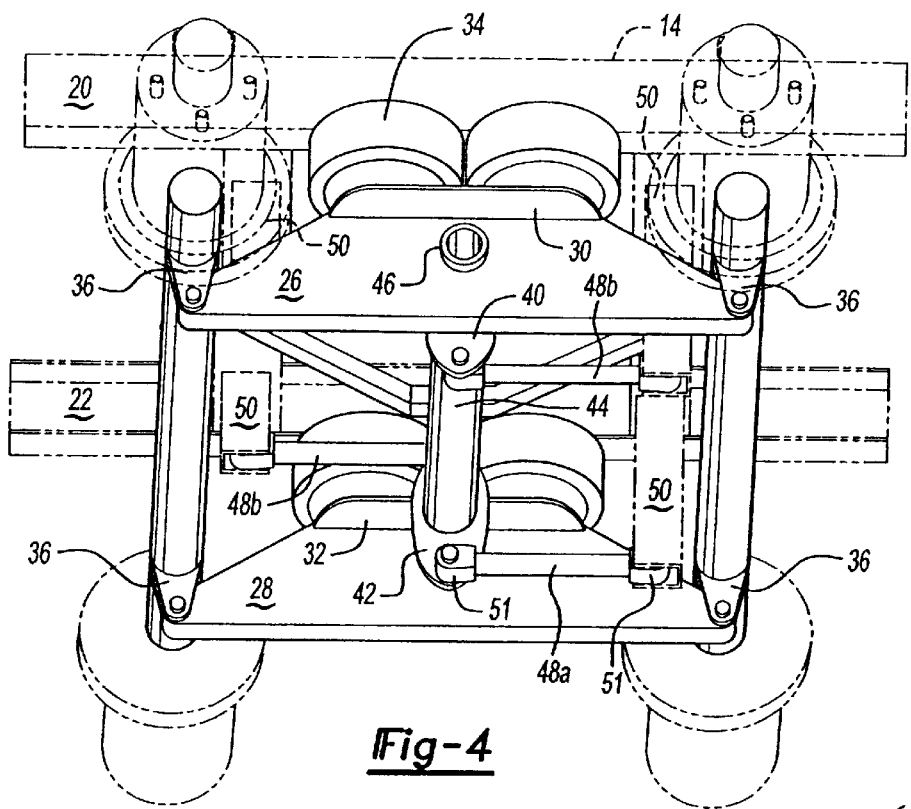
FIG. 4 is a lower perspective view of the suspension system according to the present invention.

Referring to FIG. 4, each walking beam 26, 28 is constrained against fore-aft movement through a pair of watts linkages 40, 42 that are attached to the subframe 14. The watts linkages 40, 42 are separated by a lateral torsion tube 44 which defines an axis C centered between the axles 16, 18. That is, the torsion tube 44 is transverse to the walking beams 26, 28 which pivot about axis C. The watts linkages extend radially from the torsion tube 44 and are rotationally arranged substantially perpendicular to the walking beams 26, 28. Preferably, the watts linkages 40, 42 are mounted directly to the torsion tube 44 through welding or the like. The watts linkages 40, 42 are preferably substantially T-shaped components upon which the walking beams 26, 28 pivot.

Figure 5:
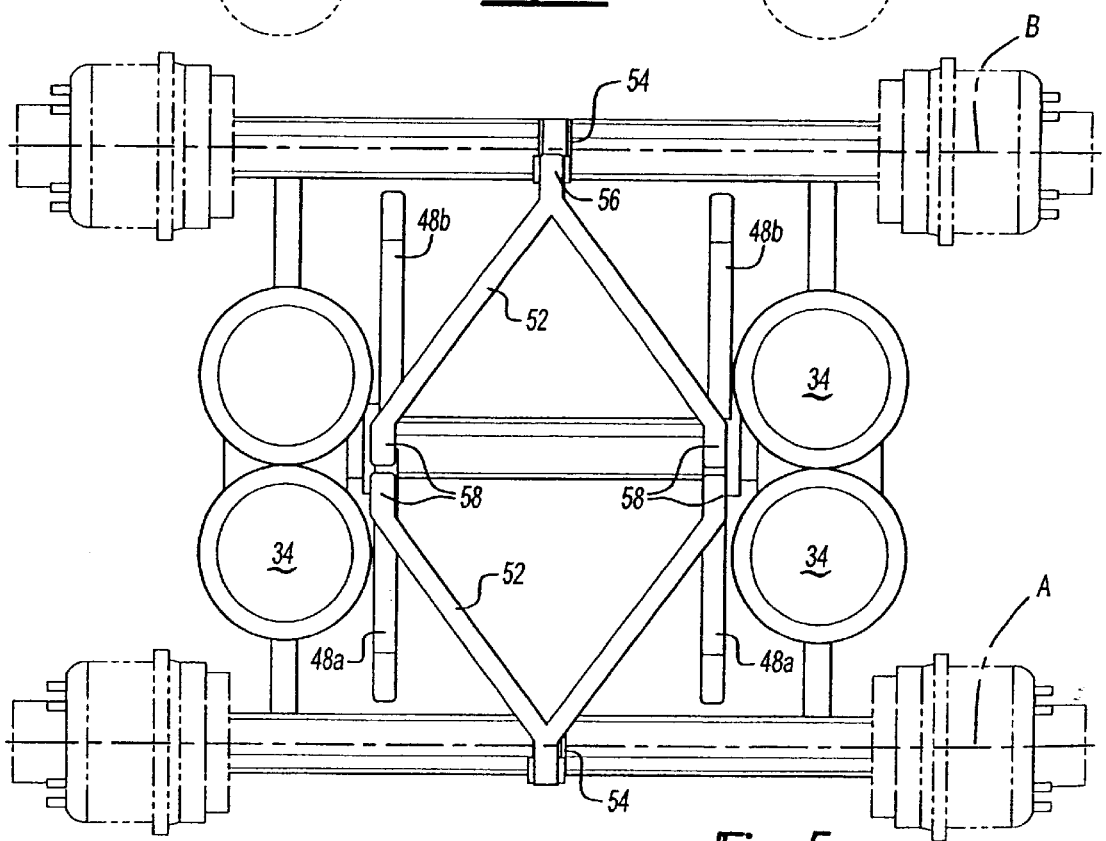
FIG. 5 is a top perspective view of the suspension system according to the present invention.

The watts linkages 40, 42 are not constrained against lateral nor vertical movement. Each walking beam 26, 28 is connected to its respective watts linkages 40, 42 through a revolute joint 46. A pair of tie-rods 48a, 48b are attached to each watts linkages 40, 42 and supports 50 which extend perpendicularly from the subframe 14 through spherical joints 51. The tie rods 48a, 48b extend from each arm of the watts linkages 40, 42 and are arranged substantially parallel to the longitudinal axis 24 (FIG. 5). Spherical joints 57 also interconnect each tie rod 48 with the watts linkages. That, is each tie rod 48a, 48b includes a spherical joints 51 at each end.

Referring to FIG. 5, each axle 16, 18 is further restrained by a V-rod 52 attached to an upper bracket 54 extending from each axle 16, 18 (also illustrated in FIG. 1). The V-rod 52 is preferably mounted to a respective axle 16, 18 at the single upper bracket 54 along the vehicle centerline 24. In other words, the open end of each V-rod 52 faces the other. At the axle 16, 18, the V-rod 52 is preferably constrained to the upper bracket 54 through a spherical joint 56. At the subframe 14, each V-rod 52 is constrained through a spherical joint 58, however, a revolute joint at this interface will also benefit from the present invention. It should be understood that the universal articulation of a spherical joint is preferred, but other factors such as cost and complexity may dictate the usage of a revolute joint.

The roll center height for each axle is located at the point at which the V-rod 52 comes in contact with the single upper bracket 54. Placing this connection higher or lower will result in either a higher or lower roll center height. The roll axis is a line that passes through both of these points between the two axles. For example only, if the V-rod connection to the rear axle 18 was to be raised slightly and the front V-rod 52 connection was to be lowered slightly, the roll axis would result in a roll induced understeer condition for the suspension.

Each airbag (or pair) 34 is mounted to the spring pads 30, 32 of each walking beam 26, 28. Preferably, the airbags 34 are mounted along the longitudinal centerline of the walking beams 26, 28 and directly above the revolute joint 46. In this manner, all vertical forces travel up through the walking beam 26, 28 and into the airbag 34.

The suspension system 10 of the present invention provides for stiffness in each articulation mode (jounce, roll, pitch, warp) to be independently adjusted. In jounce, the stiffness is controlled solely by the airbags 34. In roll, the airbags 34 are augmented by the stiffness of the torsion tube 44 between the watts linkages 40, 42. In pitch, the tandem axles 16, 18 are movable to "equalize" pitch change with little resistance. In warp, each axle 16, 18 is in opposing roll and free to move on the spherical joints 38 with minimal resistance.

The present invention therefore provides stiffness in jounce and roll, but minimal stiffness in pitch and warp mode. Decreasing warp stiffness significantly reduces single wheel lift force (such as striking a curb) by putting associated springs and equalizers in series instead of parallel. Thus, two springs in series have half the spring rate of either spring. Single wheel lift stiffness is primarily determined by the series-spring movement of the airbags 34 and the relative rotation of the watts linkages 40, 42. Minimizing single wheel stiffness advantageously increases longevity of the suspension which heretofore has been effected by harsh driving and road conditions.

During braking, forces from under the axle 16,18 centerlines A,B are passed through tension/compression of the walking beams 26,28 through the revolute joint at the watts linkages 40,42 and through tension compression of the four tie rods 48a, 48b. Braking forces over the axle 16,18 centerline A,B are reacted through tension/compression of the upper V-rods and into the suspension subframe.

During lateral acceleration, all forces are taken up by the upper V-rods 52 as the walking beams 26,28 and watts linkages 40,42 are not constrained against lateral movement.

There are no shear forces nor bending moments developed in the watts linkages 40,42 during jounce. During roll, one walking beam 26,28 will move upwards in relation to the subframe and the other 28,26 downwards. This movement will induce a relative rotation between the watts linkages 40,42 that was not present in jounce. Therefore, additional roll stiffness is provided by connecting the two watts linkages 40,42 through the torsion tube 44.

The semi-balanced suspension system 10 provides stiffness in jounce and in roll, but minimal or no stiffness in pitch and warp. A trailer that is supported at either end by a semi-balanced suspension system 10 has no need for pitch stiffness at either end as the vehicle will pitch as a body in proportion to the jounce stiffness at either end.

Dock walk is practically eliminated by the elimination of the short swing arm effect in a trailing arm suspension.

Furthermore, it still is worth stating that the present invention could be used anyplace where a traditional tandem suspension resides and there is a need for inter-axle load equalization.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A tandem axle suspension system comprising:
   a pair of walking beams substantially parallel to a vehicle longitudinal axis;
   a first and a second axle mounted to said pair of walking beams, said first and second axle mounted to said pair of walking beams through a spherical joint;
   a torsion tube pivotally mounted to said pair of walking beams, said pair of walking beams pivotable about a pivot axis defined by said torsion tube; and
   a pair of watts linkages mounted to said torsion tube, each of said watts linkages mounted to a fixed structure through a pair of tie rods, each of said tie rods mounted to said watts linkage and said fixed structure through a spherical joint.

2. The tandem axle suspension system as recited in claim 1, wherein each of said first and second axles are mounted to said pair of walking beams through a pair of lower outboard brackets.

3. The tandem axle suspension system as recited in claim 2, further comprising a first V-rod mounted to an upper bracket extending from said first axle and a second V-rod mounted to an upper bracket extending from said second axle, said first and second upper bracket parallel to said pair of lower outboard brackets.

4. The tandem axle suspension system as recited in claim 3, wherein an open end of said first V-rod faces an open end of said second V-rod.

5. The tandem axle suspension system as recited in claim 3, wherein said upper bracket is located along said vehicle longitudinal axis.

6. The tandem axle suspension system as recited in claim 5, further comprising a spherical joint between said V-rod and said upper mounting bracket.

7. The tandem axle suspension system as recited in claim 1, further comprising a spring pad extending from each of said pair of walking beams, an air bag mounted to each of said spring pads and a vehicle longitudinal frame member.

8. The tandem axle suspension system as recited in claim 1, further comprising a revolute joint between said torque tube and each of said pair of walking beams.

9. A tandem axle suspension system comprising:
   a vehicle subframe comprising a first and a second longitudinal member, a vehicle longitudinal axis defined substantially parallel to said first and second longitudinal member;
   a first walking beam substantially parallel to said first longitudinal frame member;
   a second walking beam substantially parallel to said second longitudinal frame member;
   a first and a second axle mounted to said pair of walking beams, said first and second axle mounted to said pair of walking beams through a spherical joint;
   a torsion tube pivotally mounted to said pair of walking beams, said pair of walking beams pivotable about a pivot axis defined by said torsion tube;
   a first air bag between said first walking beam and said first longitudinal member, said first air bag adjacent said torsion tube;
   a second air bag between said first walking beam and said first longitudinal member, said second air bag adjacent said torsion tube; and
   a pair of watts linkages mounted to said torsion tube, each of said watts linkages mounted to a fixed structure through a pair of tie rods, each of said tie rods mounted to said watts linkage and said fixed structure through a spherical joint.

10. The tandem axle suspension system as recited in claim 9, wherein each of said first and second axles are mounted to said first and second walking beams through a pair of lower outboard brackets extending from each of said first and second axles.

11. The tandem axle suspension system as recited in claim 10, further comprising a first V-rod mounted to an upper bracket extending from said first axle and a second V-rod mounted to an upper bracket extending from said second axle, said first and second upper brackets parallel to said pair of lower outboard brackets.

12. The tandem axle suspension system as recited in claim 11, wherein said upper bracket is located along said vehicle longitudinal axis.

13. The tandem axle suspension system as recited in claim 12, further comprising a spherical joint between said V-rod and said upper mounting bracket.

* * * * *